(12) United States Patent
Rengert et al.

(10) Patent No.: US 9,565,632 B2
(45) Date of Patent: Feb. 7, 2017

(54) MANAGING ULTRA LOW ENERGY (ULE) DEVICES USING A BASE STATION CAPABLE OF ENTERING A NO EMISSION MODE (NEMO)

(71) Applicant: DSP Group LTD., Herzeliya (IL)

(72) Inventors: Otmar Rengert, Nuremberg (DE); Jochen Kilian, Rothenburg ob der Tauber (DE)

(73) Assignee: DSP Group Ltd., Herzliya (IL)

( * ) Notice: Subject to any disclaimer, the term of this patent is extended or adjusted under 35 U.S.C. 154(b) by 133 days.

(21) Appl. No.: 14/447,721

(22) Filed: Jul. 31, 2014

(65) Prior Publication Data

US 2015/0049658 A1    Feb. 19, 2015

Related U.S. Application Data

(60) Provisional application No. 61/867,171, filed on Aug. 19, 2013.

(51) Int. Cl.
*H04W 52/02* (2009.01)

(52) U.S. Cl.
CPC ..... *H04W 52/0219* (2013.01); *H04W 52/0216* (2013.01)

(58) Field of Classification Search
CPC ........... H04M 1/6066; H04W 52/0219; H04W 72/042; H04W 52/0216; H04W 88/10
See application file for complete search history.

(56) References Cited

U.S. PATENT DOCUMENTS

| 2009/0197589 | A1* | 8/2009 | Kitazoe | H04W 76/045 455/422.1 |
| 2010/0039971 | A1* | 2/2010 | Lor | H04W 52/0274 370/311 |
| 2010/0246591 | A1* | 9/2010 | Gobriel | H04L 12/12 370/412 |
| 2011/0188490 | A1* | 8/2011 | Bjarnason | H04W 56/0045 370/350 |
| 2012/0202484 | A1* | 8/2012 | Dickinson | H04W 16/14 455/426.1 |
| 2013/0182622 | A1* | 7/2013 | Lin | H04W 52/0251 370/311 |

\* cited by examiner

*Primary Examiner* — Khaled Kassim
*Assistant Examiner* — Zhaohui Yang
(74) *Attorney, Agent, or Firm* — Reches Patents (57) ABSTRACT

A method that includes operating a base station at a first operational mode thereby preventing the base station from a periodically transmitting a beacon; detecting, by the base station, a transmission from a first wireless communication device; determining, by the base station and in response to the transmission from the first wireless communication device, whether to continue operating in the no emission mode or to enter a emission mode during which the base station is allowed to transmit the beacon; and entering the second operational mode, if it is determined to enter the second operational mode, and sending the beacon to the first wireless communication device.

24 Claims, 8 Drawing Sheets

MANAGING ULTRA LOW ENERGY (ULE) DEVICES USING A BASE STATION CAPABLE OF ENTERING A NO EMISSION MODE (NEMO)

RELATED APPLICATIONS

This invention claims priority from U.S. provisional patent Ser. No. 61/867,171 and filing date Aug. 19, 2013 which is incorporated herein by reference.

BACKGROUND OF THE INVENTION

Field of the Invention

This invention relates to the field of wireless communication systems.

Background to the Invention

The following abbreviations are being used in the specification:

DECT Digitally enhanced cordless telecommunication
ULE Ultra low energy
NEMo No Emission Mode
PM Packet Mode transfer Today a ULE base station must repetitively transmit a beacon known as a ULE dummy bearer, which allows any ULE device to lock fast, using the information that is contained in a ULE dummy bearer BField of the ULE dummy bearer.

This requirement to have repetitive ULE dummy contradicts with NEMo operation, where the base station is supposed to switch off any transmitter for a long time, in order to be environmental or health friendly.

This makes it necessary today, to disable NEMo if ULE devices are enabled in the base station (thereby allowing the base station to communicate with ULE devices). The disabling of NEMo mode is often not acceptable to customers.

In order to achieve the low power demands a ULE device will spend the majority of its time in a "deep sleep" state, from which it will awake periodically or when triggered, to communicate with the base-station.

ULE

There are 2 main aspects which minimize the power consumption of the ULE device: (a) ULE device will gain sync (fast sync) with the base-station very quickly and (b) the communication between a ULE device and the base station is very short.

Fast Sync involves:
a. The base station entertains a permanent ULE dummy bearer (it repetitively transmits the ULE dummy bearer).
b. The ULE dummy bearer has a special sync word so that only ULE devices will lock to it very quickly.
c. The ULE dummy bearer has a "Sync Subfield" which allows the ULE device to lock to it very quickly (no need to wait and collect Qt/Pt information from several frames). This allows the ULE device to synchronize.
d. The ULE device will have remembered where it found the ULE dummy bearer last time, assuming the base station hasn't changed the carrier. This means the ULE device most of the time does not have to scan all 10 carriers.

The communication between ULE device and base station is very short—"Packet Mode" and a ULE device can start packet-mode communication on any "free" slot of the base station. In order to save current and time of the ULE device the base station may perform RSSI scanning on the "free" slots and send the quiet slots information to ULE device on extended dummy information included in the ULE dummy bearer.

Communication with the ULE device is generally implemented by a short exchange of packets.

NEMo
a. Both NEMo handset and base station know whether the other one can do NEMo.
b. NEMo is initiated from the base, but only if all handsets have indicated to support it during registration.
c. Base station transmits (pages) the fact that it soon will enter NEMo. This is a countdown mechanism. If any NEMo handset doesn't like that, it can setup a link. The NEMo handset would setup a link only when there is a call requested.
d. Once the countdown ends the base station stops all transmissions. The base station and the NEMo handsets perform NEMo scanning in order to detect transmissions from each other.
e. The base station continuously scans. A NEMo handset scans each 1.28 seconds (N210/2).
f. When the base station wants to wake up the NEMo handset (always all the NEMo handsets will be woken), the base station transmits a NEMo Dummy bearer, and optional additional DummyPointer bearers for 2.56 s (N210).
g. When a NEMo handset sees them, it wakes up, quickly synchronizes all counters, and sets up a DummyRequest bearer.
h. When the NEMo handset wants to wake up the base station, it transmits a DummyRequest bearer for 16 frames (N211), and falls back to immediate NEMo scanning.
i. When the base station "sees" the DummyRequest bearer and establishes a NEMoDummy bearer (same as base station imitated wakeup).
j. NEMo devices today are typically operating on a fixed preferred carrier ($Q12.a_{23}=0$).

There is a growing need to reduce the emission of a base station while supporting ultra low energy (ULE) devices and NEMo devices.

SUMMARY OF THE INVENTION

There are provided methods, non-transitory computer readable media and wireless communication devices.

According to an embodiment of the invention there is provided a method that may include operating a base station at a first operational mode thereby preventing the base station from transmitting one or more beacons; detecting, by the base station, a transmission from a wireless communication device; determining, by the base station and in response to the transmission from the wireless communication device, whether to continue operating in the no emission mode or to enter a emission mode during which the base station is allowed to transmit the one or more beacons; and entering the emission mode, if it is determined to enter the emission mode and transmitting the one or more beacon to the wireless communication device.

The determining of whether to enter the emission mode may be responsive to an expected amount of data to be received from the wireless communication device.

The wireless communication device may be of a first type of wireless communication devices and the method may include determining whether to awaken one or more wireless communication devices of a second type.

The first type of wireless communication devices may include ultra low energy (ULE) wireless communication devices and the second type of wireless communication devices may include no-emission mode (NEMo) wireless communication devices.

The method may include awakening at least one wireless communication devices of the second type if the base station communicated with the wireless communication device of the first type for at least a predefined duration.

The transmitting of the one or more beacons may include transmitting different types of beacons to different types of wireless communication devices.

The different types of beacons may be identified by different identifiers.

The transmitting of the one or more beacons may include transmitting a hybrid beacon for controlling a behavior of different types of wireless communication devices.

The wireless communication device is of a second type of wireless communication devices.

According to an embodiment of the invention there may be provided a non-transitory computer readable medium that stores instructions that once executed by a base station cause the base station to operate at a first operational mode thereby preventing the base station from transmitting one or more beacons; detect a transmission from a wireless communication device; determine, in response to the transmission from the wireless communication device, whether to continue operating in the no emission mode or to enter a emission mode during which the base station is allowed to transmit the one or more beacons; and enter the emission mode, if it is determined to enter the emission mode and transmit the one or more beacon to the wireless communication device.

According to an embodiment of the invention there may be provided a base station that may include a receiver, a transmitter and a controller; wherein the controller may be arranged to operate the base station at a first operational mode thereby preventing the base station from transmitting one or more beacons; wherein the receiver may be arranged to detect a transmission from a wireless communication device; wherein the controller may be arranged to determine, in response to the transmission from the wireless communication device, whether to continue operating in the no emission mode or to enter a emission mode during which the base station is allowed to transmit the one or more beacons; and wherein the controller may be arranged to operate the base station in an emission mode, if it is determined to enter the emission mode during which the transmitter may be arranged to transmit the one or more beacon to the wireless communication device.

The controller may be arranged to determine whether to enter the emission mode in response to an expected amount of data to be received from the wireless communication device.

The wireless communication device is of a first type of wireless communication devices; and wherein the controller may be arranged to determine whether to awake one or more wireless communication devices of a second type.

The first type of wireless communication devices may include ultra low energy (ULE) wireless communication devices and wherein the second type of wireless communication devices may include no-emission mode (NEMo) wireless communication devices.

The controller may be arranged to trigger an awakening of at least one wireless communication devices of the second type if the base station communicated with the wireless communication device of the first type for at least a predefined duration.

The transmitter may be arranged to transmit the one or more beacons by transmitting different types of beacons to different types of wireless communication devices.

The different types of beacons are identified by different identifiers.

The transmitter may be arranged to transmit the one or more beacons by transmitting a hybrid beacon for controlling a behavior of different types of wireless communication devices.

The wireless communication device is of a second type of wireless communication devices.

BRIEF DESCRIPTION OF DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a system capable of executing the method and should be applied mutatis mutandis to a non-transitory computer readable medium that stores instructions that once executed by a computer result in the execution of the method.

Any reference in the specification to a system should be applied mutatis mutandis to a method that may be executed by the system and should be applied mutatis mutandis to a non-transitory computer readable medium that stores instructions that may be executed by the system.

Any reference in the specification to a non-transitory computer readable medium should be applied mutatis mutandis to a system capable of executing the instructions stored in the non-transitory computer readable medium and should be applied mutatis mutandis to method that may be executed by a computer that reads the instructions stored in the non-transitory computer readable medium.

The following description refers to various modes of operation of wireless communication devices such as a sleep mode and an awake mode. These modes are only examples of multiple possible modes that differ from each other by power consumption and the ability of the wireless communication devices to communicate. The wireless communication devices can operate at more than two different operational modes that differ by power consumption and communication capability. For example, a wireless communication device can enter and exit a wireless communication facilitating mode in which the wireless communication device can wirelessly communicate. This mode can be regarded as an awake mode. The wireless communication facilitating mode may be associated with higher power consumption than another mode that does not facilitate communication (a wireless communication non-facilitating mode) such as a sleep mode.

According to an embodiment of the invention the base station is arranged to operate in a no emission mode (NEMo) during which it does not periodically transmits beacons (and may even prevent from performing any type of transmissions) and to operate in a no emission (no NEMO) mode during which it may transmit beacons (dummy bearers).

The base station may communicate with multiple types of wireless communication devices such as ULE devices (a first type of wireless communication device) and NEMo devices such as NEMo handsets (a second type of wireless communication devices).

According to an embodiment of the invention the ULE device may perform asynchronous transmissions (for example—of short packets) or request the base station to enter the non-NEMo mode (by requesting the base station to transmit a dummy bearer) thereby allowing (for example) the transmission of longer packets. The transmission of longer packets may be done in a synchronous manner using beacons transmitted by the base station.

It is noted that the distinction (made by the ULE device) between requesting the base station to enter a non-NEMo mode or performing an asynchronous transmission may depend on the length of the transmitted content or on any other (or additional) criterion.

It is noted that in contrary to NEMo handsets, the ULE devices may not be able to follow a NEMo countdown. Thus the ULE devices will not be aware when the base station eventually will stop transmission beacons, or got woken by a legacy handset.

The ULE device may have one or more mechanisms to cope with this uncertainty and some of these mechanism are listed below:
  a. As the ULE dummy bearer is normally off, the channel selection in which the ULE device will transmit is done by the ULE device. Assuming that synchronous transmission is managed by time frames of a certain length then the ULE device may monitor a time slot of a certain time frame and if it does not detect a transmission by another device it may transmit the requested content at another time slot that belongs to the next time frame. When the base station is active with legacy handsets (not in NEMo), it entertains a permanent ULE dummy bearer.

During a 2.5 s NEMo wakeup phase where normally a NEMo dummy bearer is maintained, the base station can (a) transmit two types of dummy bearers—one for the ULE device and one for the NEMo devices, or (b) transmit a hybrid dummy bearer (NEMo++ dummy bearer) that includes control fields for both ULE devices and NEMo devices.

The hybrid dummy bearer is also referred to as NEMo++ dummy bearer. It may incorporate the ULE dummy bearer BField into a NEMo Dummy bearer itself by using use a long time slot NEMo dummy bearer which could carry all ULE dummy bearer BField subfields.

The following is assumed (only as non-limiting examples) to allow for a balance between ULE device compliant and NEMo compliant operation of the base station:
  a. The base station may operate, during most of the time in NEMo mode. It is noted that usually calls with legacy NEMo handsets are rare (for example—overall calls duration may be 1 hour a day).
  b. The packet mode transfer (between ULE devices and the base station) is mostly extremely short, and usually involves transmitting keep alive messages (for example one packet per keep alive message from the ULE device to the base station).
  c. Longer ULE packet mode transfers are relatively rare (because either base station should exit NEMo, or NEMo handsets should not to exit NEMo mode during this transfer).
  d. As the base station is doing NEMo scanning, there may be a limit on the number of carriers that can be used for ULE single packet mode transfer (to be detected during the NEMo scanning).

First Scenario—ULE Device Requiring Short Packet Mode Transfer.

If a ULE device only needs to send a 'still alive' message, the ULE device can send this data in the first transmission asynchronously, and scan for the base station ACK in the subsequent half frame.

Figure 1:
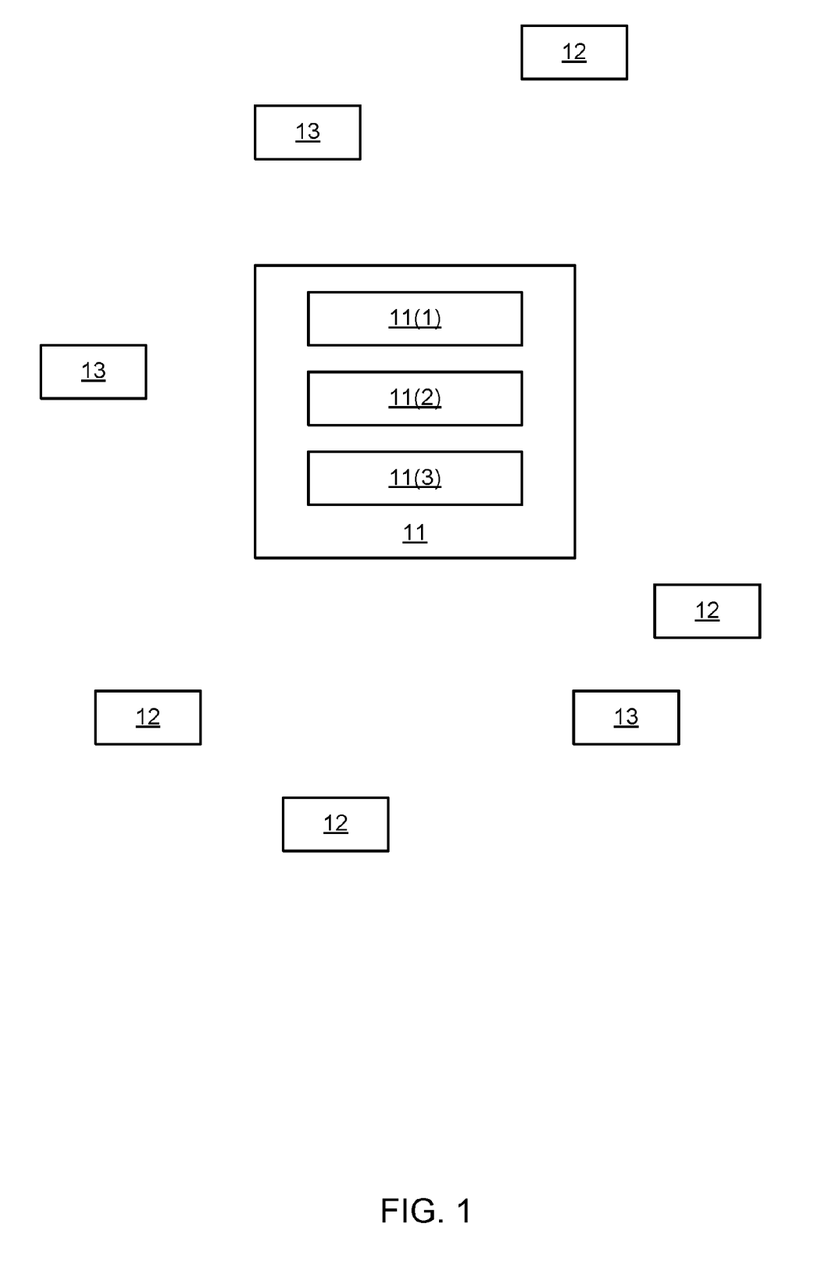
FIG. 1 illustrates a base station, ULE devices and NEMo devices according to an embodiment of the invention.

FIG. 1 illustrates a system 10 that includes a base station 11, one or more ULE devices 12 and one or more NEMo handsets 13. The base station 11 is a communication device that may communicate with ULE devices 12 and NEMO handsets 13. It may be DECT compliant, ULE DECT compliant or can be compliant with any other communication protocols.

The base station 11 may include a transmitter 11(1), a receiver 11(2) and a controller 11(3). The controller 11(3) controls (or at least assists in controlling) the operation of the receiver and/or transmitter. The controller 11(3) may be included in the receiver and/or transmitter. There may be multiple controllers (such as a receiver controller and a transmitter controller) that form controller 11(3). The controller may be a general purpose controller and/or a general purpose processor, may be a dedicated controller and the like. It may execute software, middleware and/or firmware that once executed causes the controller to participate in the execution of any method illustrated in the specification.

The controller 11(3) may be arranged to operate (for example by sending the appropriate commands to the receiver and/or transmitter) the base station at a first operational mode thereby preventing the base station from transmitting one or more beacons. The receiver 11(2) is arranged to detect a transmission from a wireless communication device. The controller 11(3) is arranged to determine, in response to the transmission from the wireless communication device, whether to continue operating in the no emission mode or to enter a emission mode during which the base station is allowed to transmit the one or more beacons. The controller 11(3) is arranged to operate the base station in an emission mode, if it is determined to enter the emission mode during which the transmitter 11(1) is arranged to transmit the one or more beacon to the wireless communication device.

In various scenarios a base station or a NEMo handset may perform a scan. The scan may include scanning an entire set of time slots of one or more frequency channel that can be used for communication between the base station and the NEMo handset (for example 49 time slots per frequency channel), or scanning only a subset of the set of time slots of one or more frequency channels. A scan may include scanning one, some or all of the frequency channels available for used for communication between the base station and the NEMo handset.

A scan can start from an arbitrary time slot or from a time slot determined according to a certain criterion (for example a time slot that was successfully used in the past, a time slot that is characterized by better parameters (for example higher reception levels (can be measured by RSSI or any other measure), and the like. The selection of the time slot from which the scanning starts may be random or pseudo random. The scanning itself (selection of time slots after a failure of the first time slot) may be random, pseudo-random or responsive to previous search and/or transmission attempts.

A transmission may occur in a time slot even if the RSSI of the time slot is below a threshold. Alternatively, such a transmission may not occur if the RSSI of the time slot is below that threshold.

The scanning may include trying to transmit over a time slot once or multiple times. In both cases different transmission attempts may be performed with the same transmission path gain or with different transmission path gains. The transmission gains of two transmission attempts may be the same while the transmission gains of two other transmission attempts may differ from each other. The transmission gains may be predetermined, selected in a random manner or in a pseudo random manner. For example the transmission gain can be lowered (and the amplitude of the transmitted signals can be reduced) following multiple successful transmission attempts.

In various scenarios a base station or a NEMo handset may perform a scan. The scan may include scanning an entire set of time slots of one or more frequency channel that can be used for communication between the base station and the NEMo handset (for example 49 time slots per frequency channel), or scanning only a subset of the set of time slots of one or more frequency channels. A scan may include scanning one, some or all of the frequency channels available for used for communication between the base station and the NEMo handset.

A scan can start from an arbitrary frequency channel or from a frequency channel determined according to a certain criterion (for example a frequency channel that was successfully used in the past, a frequency channel that is characterized by better parameters (for example higher reception levels (can be measured by RSSI or any other measure), and the like. The selection of the frequency channel from which the scanning starts may be random or pseudo random. The scanning itself (selection of frequency channels after a failure of the first frequency channel) may be random, pseudo-random or responsive to previous search and/or transmission attempts.

A transmission may occur in a frequency channel even if the RSSI of the frequency channel is below a threshold. Alternatively, such a transmission may not occur if the RSSI of the frequency channel is below that threshold.

The scanning may include trying to transmit over a frequency channel once or multiple times. In both cases different transmission attempts may be performed with the same transmission path gain or with different transmission path gains. The transmission gains of two transmission attempts may be the same while the transmission gains of two other transmission attempts may differ from each other. The transmission gains may be predetermined, selected in a random manner or in a pseudo random manner. For example the transmission gain can be lowered (and the amplitude of the transmitted signals can be reduced) following multiple successful transmission attempts.

Figure 2:
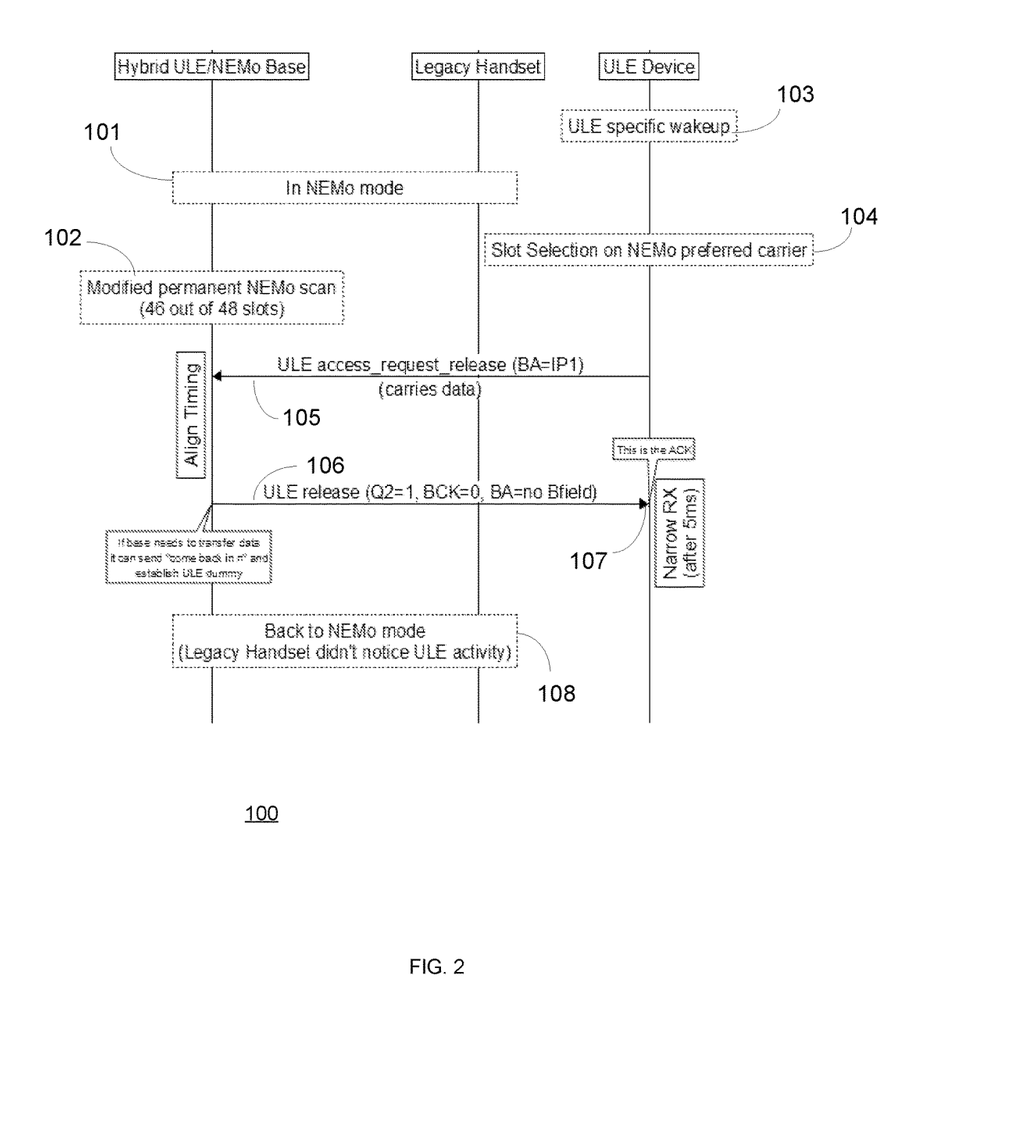
FIG. 2 is a time diagram according to an embodiment of the invention.

FIG. 2 is a timing diagram 100 that illustrates a short packet mode according to an embodiment of the invention.

Timing diagram 100 illustrates the following events:
a. Base station and NEMo handsets are in NEMo mode (101). The base station performs a scanning of channels (slots) available for transmission. For example—by a permanent NEMo scan (scanning all time slots) or by a modified permanent NEMo scan (46 out of 48 slots) 102. The NEMo handset may be in NEMo mode during the entire timing diagram.
b. ULE device wakes up (ULE specific wakeup) 103.
c. ULE device selects a time slot for transmission (Slot selection on NEMo preferred carrier) 104. The transmission should be detected by the base station during the NEMo scan.
d. The ULE device performs an asynchronous short transmission. It may perform multiple asynchronous transmissions before the transmission is detected by the base station.
e. The base station receives the transmission and sends a response 106. This response may be an acknowledgement and/or a request from the ULE device to awake at a certain future time in order to be able to receive content from the base station.
f. The response is received by the ULE device 107 and the base station resumes its NEMo scanning 108

For that single frame where this single packet transfer happens, no other ULE device can do such a transfer, or request a ULE dummy bearer.

NEMo handsets would not be able to request a NEMo dummy bearer in this single frame. But this is not so relevant, as a single frame is covered by the legacy handset retries.

Other ULE devices cannot successfully access the base station in this single frame.

If a ULE device would need to send a bigger amount of data, it may segment that data to segments that may be transmitted during this short packet mode but may wake the base station from NEMo mode.

The wakeup request from the ULE device may differ from the wakeup request from a NEMo handset. For example—the difference may achieved, for example, by using a special tail identification (TA) bit code so the base station can differentiate a wakeup request from a NEMo handset from a ULE device wakeup request. In the ETSI DECT Standard the TA (Tail identification) bits describe, the contents of the received package. A NEMo handset may be identified by TA=011.

When the base station receives a request from a ULE device, the base station can decide whether it wants to wake legacy handsets or not.

The special bit code used by the ULE device may be, for example, using TA bits having values of 010. This combination of bits in a ULE dummy request is unique as in prior art device this combination is allocated only for transmissions from the base station to ULE devices.

Figure 8:
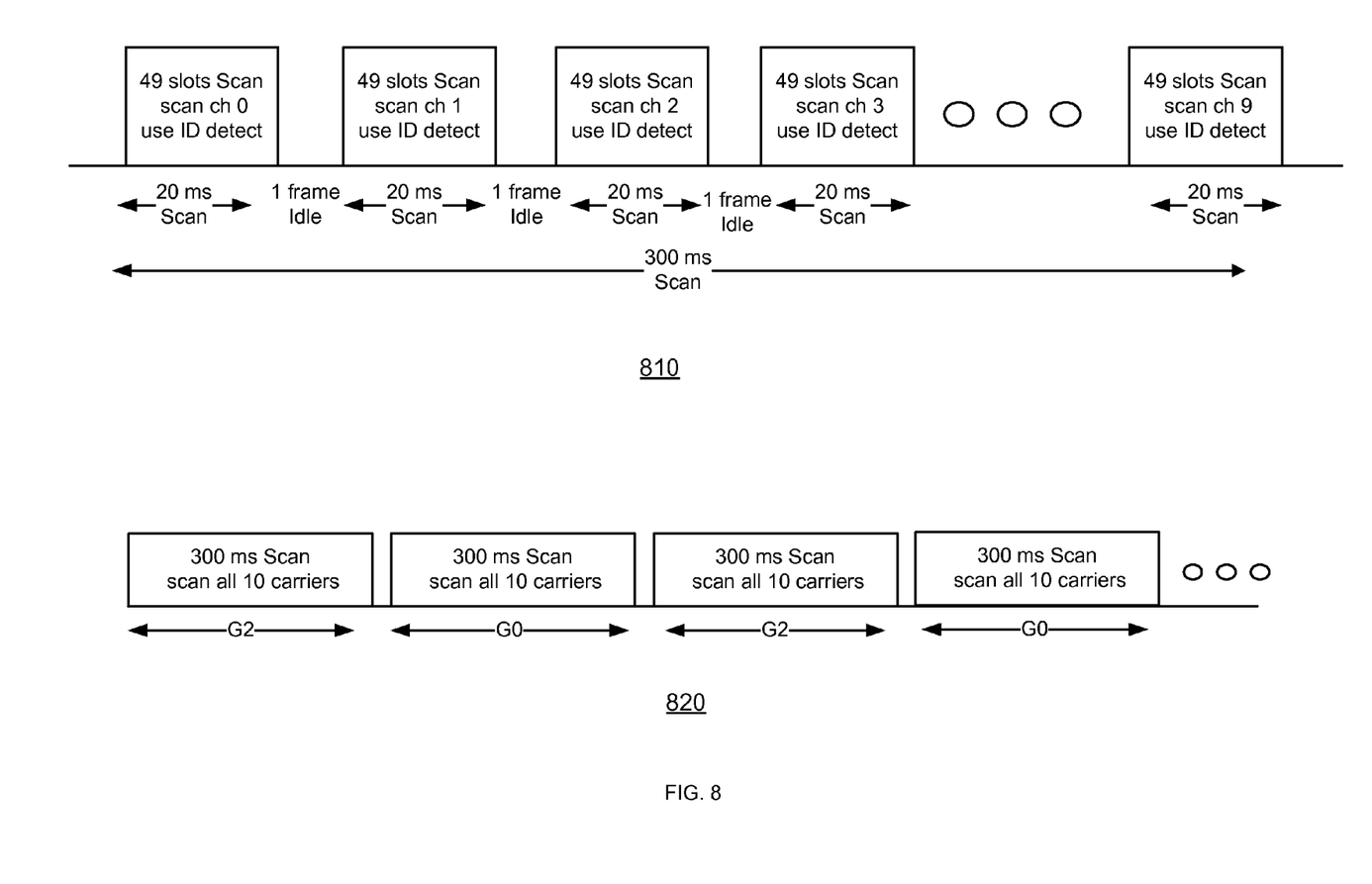
FIG. 8 illustrates two example of scan pattern according to an embodiment of the invention.

FIG. 8 illustrates two example of scan pattern 810 and 820 according to an embodiment of the invention.

Scan pattern 810 shows scanning all 49 time slots of 10 frequency channels during a period of 300 millisecond. Scan pattern 820 shows scanning time slots of 10 frequency channels using different transmission gains during different periods of 300 millisecond each.

NEMo++ Dummy Bearer

Figure 3:
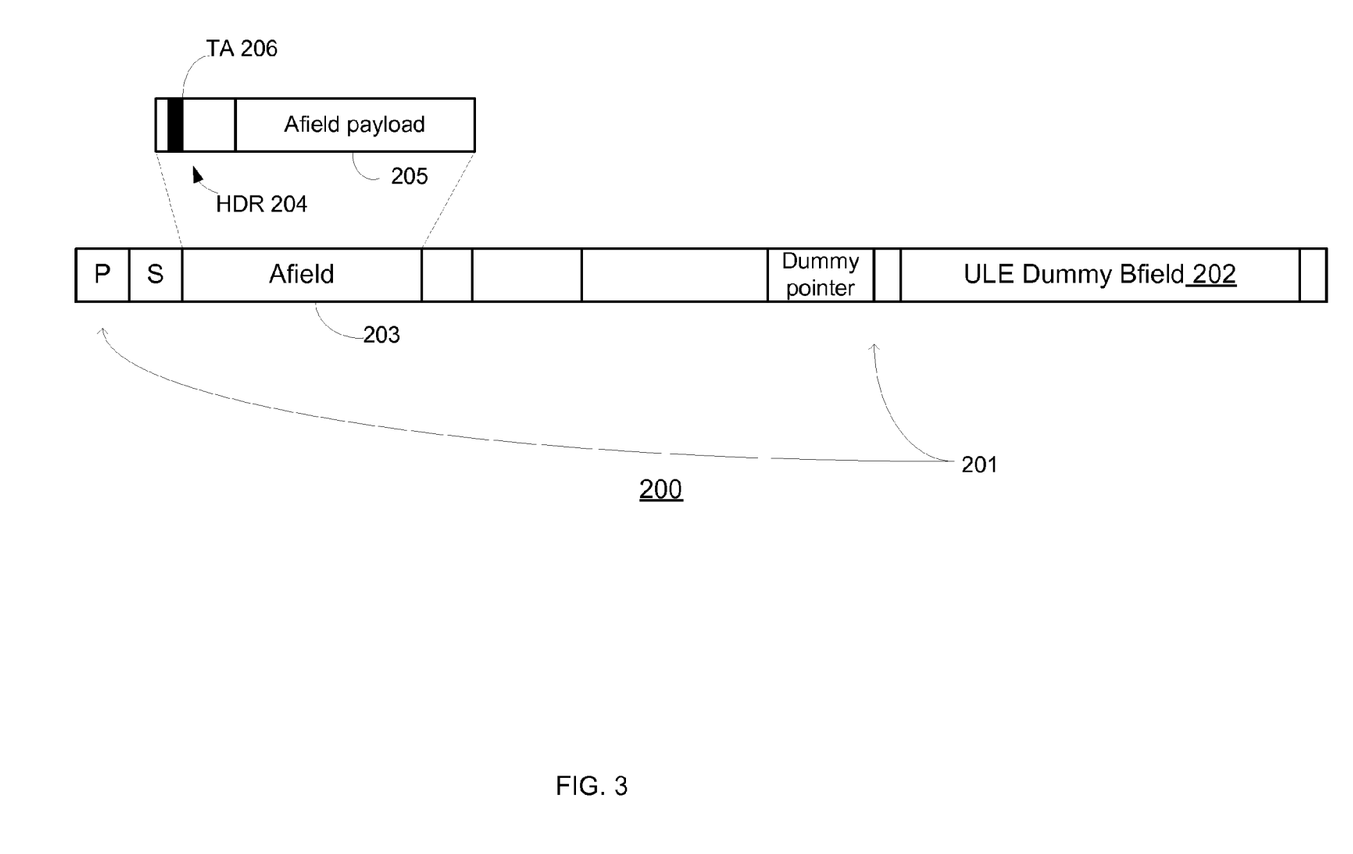
FIG. 3 illustrates a hybrid beacon according to an embodiment of the invention.

FIG. 3 illustrates a NEMo++ Dummy Bearer 200 according to an embodiment of the invention. It includes a regular NEMo dummy bearer 201, and a ULE dummy bearer BField 202. The regular NEMo dummy bearer 201 may include fields such as a preamble (P) field, a synchronization (S) field, an Afield 203, a dummy pointer and the like. The Afield includes the FP identity. The FP may be identified by an RFPI subfield. The Afield 203 is illustrated as including a header 204 and an Afield payload 205. The header 204 includes a TA field 206.

The NEMo++ Dummy Bearer can be transmitted by the base station when the base station needs to transmit a NEMo dummy bearer, and allows ULE devices to lock in this time.

This bearer allows NEMo handsets to lock, and also ULE devices will be able to lock as the ULE Dummy BField contains a ULE SYNC word 212. It is suggested to use one of the spare bits in the NEMo SyncSubfield of the ULE Dummy BField (bit 173), to indicate that this BField is part of a NEMo++ dummy bearer. That will allow the ULE devices to adjust their timing correctly to the base station timing.

Second Scenario—ULE Device Requiring Longer Packet Mode Transfer

If a ULE device would need to send a bigger amount of data, the base station may exit the NEMo mode.

As indicated above the ULE device may use a special TA bit code so the base station can differentiate a wakeup request from a NEMo handset, from a ULE device's wakeup request. With that information the base station can decide whether it wants to wake NEMo handsets (FIG. 5) or not (FIG. 4).

Figure 4:
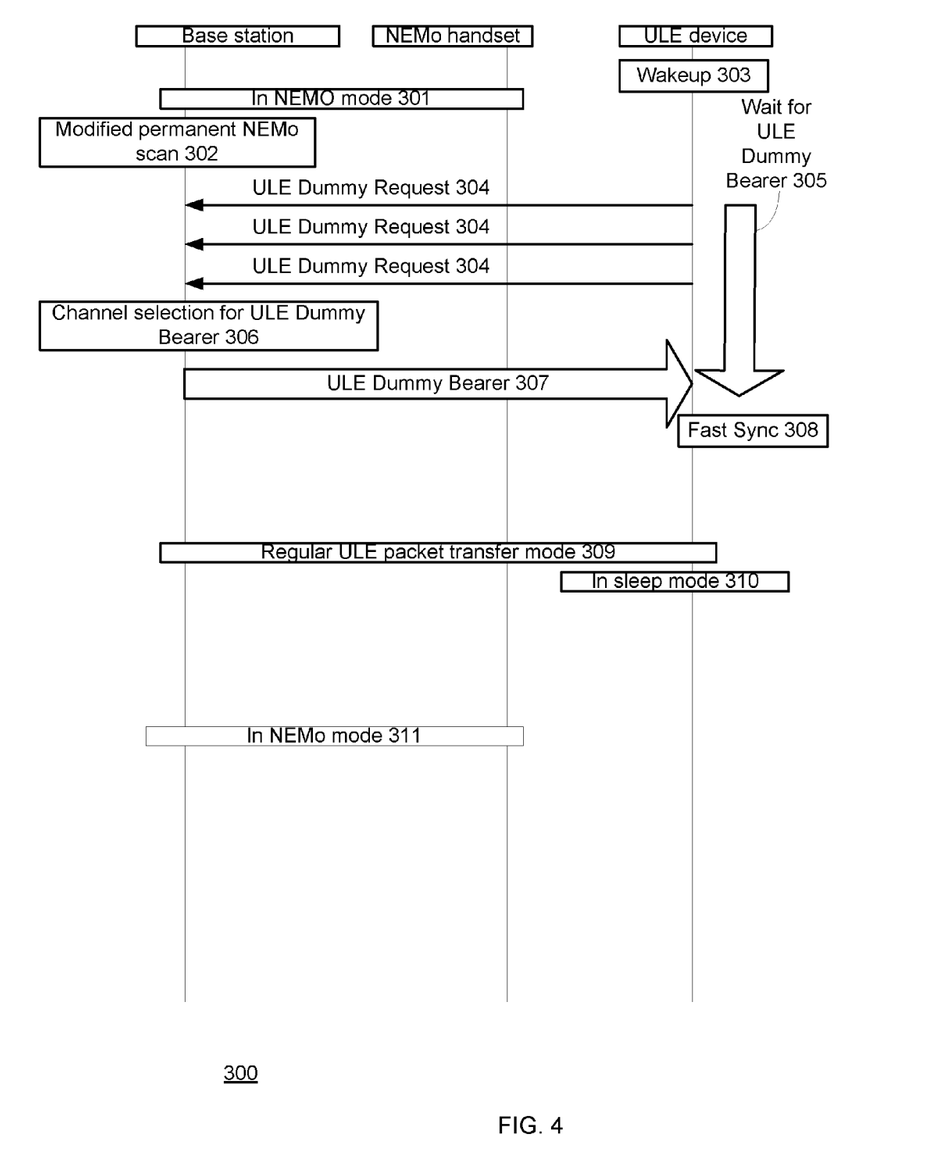
FIG. 4 is a time diagram according to an embodiment of the invention.

FIG. 4 illustrates a case in which the ULE device wakes the base station from a NEMo mode, and the base station decides not to wake the NEMo handsets.

For example, if the base station determines that there is only little data to send, then it may decide that waking the legacy NEMo handsets is not required.

It may be the application executed by the base station, that determines what to send and thus knows what is the length of data to be sent.

For example if the ULE device is a smoke detector, which only sends its battery status, then typically the base application will send nothing back at all.

Yet for another example—if the ULE device is a price label, that needs to be updated with a new price and product information, then the base application knows it will have many data to send.

FIG. 4 is a timing diagram 300 that illustrates a short packet mode according to an embodiment of the invention.

Timing diagram 300 illustrates the following events:
a. Base station and NEMo handsets are in NEMo mode (301). The base station performs a scanning of channels (slots) available for transmission (for example—scanning some or all of the slots 302). The NEMo handset may be in NEMo mode during the entire timing diagram.
b. ULE device wakes up (ULE specific wakeup) 303.
c. ULE device sends one or more (in FIG. 4 it sends three) ULE dummy requests 304. The third ULE dummy request is eventually detected by the base station during the NEMo scan. After these transmissions the ULE device waits (305) to receive a ULE dummy bearer.
d. The base station receives the ULE dummy request, selects 306 a channel for the transmission of the ULE dummy bearer and transmits 307 the ULE dummy bearer (it may exclude the RFPI in its Afield).
e. This ULE device receives the ULE dummy bearer and performs a fast synchronization (fast Sync) 308.
f. The fast synchronization is followed by performing a regular ULE packet mode transfer 309 during which content is transmitted from the ULE device to the base station.
g. At the end of the regular ULE packet mode transfer the ULE device enters a sleep mode 310 and the base station returns to operate at the NEMo mode 311.

There may be provided some fallback mechanisms:
a. If the base station does not see any data transfer from the ULE device after a predefined period lapsed from the transmission of the ULE dummy bearer it would release the ULE dummy bearer automatically.
b. If the ULE device would not receive a ULE dummy bearer within a certain period after its last ULE dummy request was sent, it may assume that its one or more ULE dummy requests were not seen by the base station, and might repeat the transmission of one or more ULE dummy requests.

When the base station operated in the regular ULE packet mode transfer it may be prevented from serving NEMo device. If the duration of the regular ULE packet mode is small enough there may be a small chance of missing a request from a NEMo device and thus the NEMo devices may not be awakened by the base station. The same applied to consecutive short packet mode transfers.

According to an embodiment of the invention the regular ULE packet mode transfer should also not carry any Nt messages (DECT messages providing identity information) from base station to handset in order to prevent NEMo handsets to wake from NEMo mode by chance.

Figure 5:
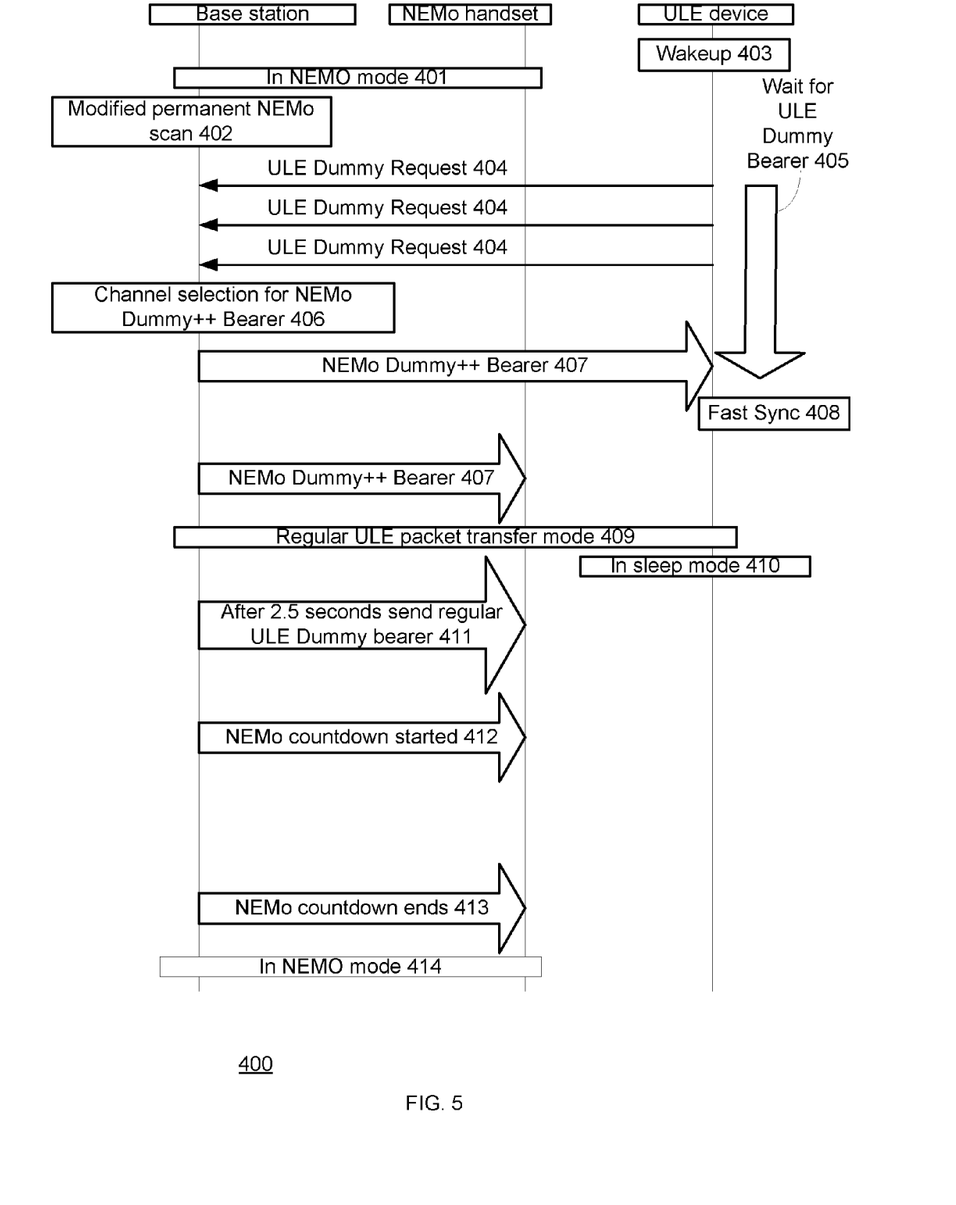
FIG. 5 is a time diagram according to an embodiment of the invention.

FIG. 5 illustrates a ULE device that wakes a base station from NEMo mode and the base station decides to wake the NEMo handsets.

If the base station knows there is a significant amount of data to send, or the base station was busy in packet mode transfer before, then it may determine to wake NEMo handsets. This is because the base station doesn't know whether the NEMo handsets tried to wake the base station while the base station was or is busy in ULE packet mode transfers.

FIG. 5 shows how the ULE PM transfer would force the base station and handset to exit NEMo temporarily.

FIG. 5 is a timing diagram 400 that illustrates a short packet mode according to an embodiment of the invention.

Timing diagram 400 illustrates the following events:
a. The base station and the NEMo handsets are in NEMo mode 401. The base station performs a scanning of channels (slots) available for transmission (modified permanent NEMo scan (46 out of 48 slots) 402. The ULE device wakes up (ULE specific wakeup) 403.
b. ULE device sends one or more (in FIG. 4 it sends three) ULE dummy requests 404. The third ULE dummy request is eventually detected by the base station during the NEMo scan. After these transmissions the ULE device waits (405) to receive a ULE dummy bearer.
c. The base station receives the ULE dummy request, selects 406 a channel for the transmission of the NEMo++ dummy bearer and transmits 407 one or more NEMo++ dummy bearers (FIG. 4 illustrates two NEMo++ dummy bearers).
d. This ULE device receives the NEMo++ dummy bearer and performs a fast synchronization (fast Sync) 408.
e. The fast synchronization is followed by performing a regular ULE packet mode transfer 409 during which content is transmitted from the ULE device to the base station. After the transmission ends the ULE device enters a sleep mode. 410
f. Both the NEMo handset and the base station are aware that after a predetermined period (for example 2.5 seconds) the base station will transmit a ULE dummy bearer 411 and start a NEMo countdown 412.
g. Once the countdown ends 413 the base station and the NEMo handsets enter NEMO mode 414.

There may be provided some fallback mechanisms:
a. If the base station does not see any data transfer from the ULE device after a predefined period lapsed from the transmission of the ULE dummy bearer it would release the ULE dummy bearer automatically.
b. If the ULE device would not receive a ULE dummy bearer within a certain period after its last ULE dummy request was sent, it may assume that its one or more ULE dummy requests were not seen by the base station, and might repeat the transmission of one or more ULE dummy requests.

The NEMo++ dummy needs some changes as the device must be able to detect this is a NEMo++ dummy bearer, and not a regular ULE dummy bearer (the required timing update is slightly different)

NEMo countdown time could be reduced to make the non-NEMo time smaller, e.g. to 15 seconds.

Typical NEMo handsets on the market today indicate NEMo state on the user interface. So waking NEMo handsets during ULE operation will be 'visible' to the end user.

Wake From Legacy NEMo Handset

Figure 6:
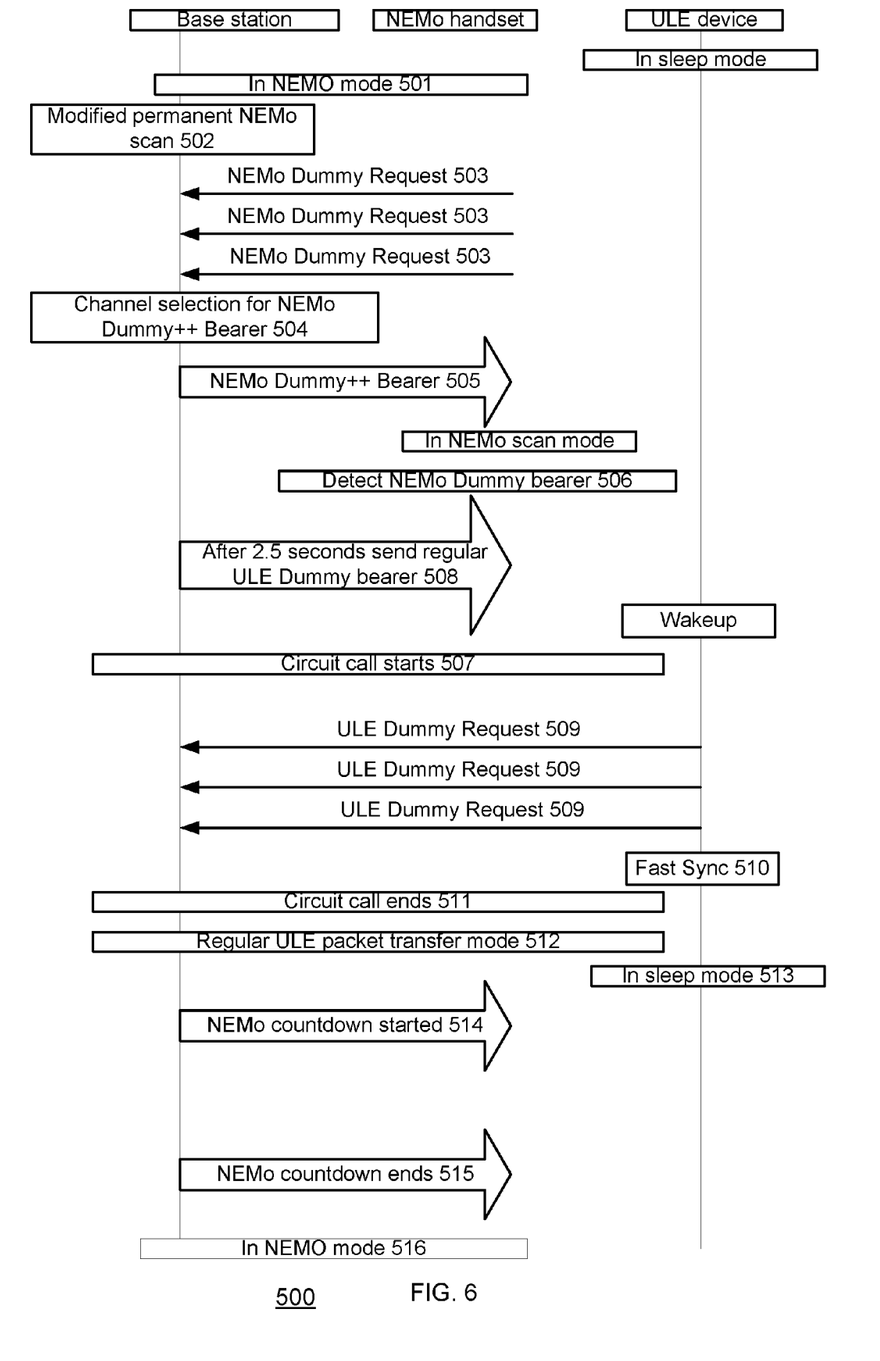
FIG. 6 is a time diagram according to an embodiment of the invention.

FIG. 6 shows how a normal NEMo handset would wake the ULE/NEMo hybrid base, and allow ULE devices to set up PM connections during the circuit call of the NEMo handset.

FIG. 6 is a timing diagram 500 that illustrates a short packet mode according to an embodiment of the invention.

Timing diagram 500 illustrates the following events:
a. Base station and NEMo handsets are in NEMo mode (501). The base station performs a scanning of channels (slots) available for transmission (normal or modified permanent NEMo scan (56 out of 58 slots) 502. The NEMo handset may be in NEMo mode during the entire timing diagram.
b. NEMo handset requests the base station to exit the NEMo mode by sending one or more (FIG. 5 illustrates three) NEMo dummy requests 503.
c. The base station receives the NEMo dummy request, selects 504 a channel for the transmission of the NEMo++ dummy bearer, and transmits 505 the NEMo++ dummy bearer.
d. The NEMo handset searches for the NEMo dummy bearer (after it sent the NEMo dummy requests) and detects 506 the NEMo++ dummy bearer and it starts a circuit call 507.
e. Both the NEMo handset and the base station are aware 508 that after a predetermined period (for example 2.5 seconds) the base station will transmit a ULE dummy bearer.
f. During the circuit call a ULE device determines that it wishes to send information and it sends one or more (FIG. 5 shows three) ULE dummy requests 509 and performs (using the NEMo++ dummy bearer they received) a fast synchronization 510.
g. After the circuit call ends 511 the ULE device and the base station exchange information according to a regular ULE packet mode transfer 512.
h. After the data is exchanged the ULE device enters a sleep mode 513, the base station starts a NEMo countdown 514 and once the countdown ends 515 the base enters a NEMo mode 516.

There may be provided some fallback mechanisms:
a. If the base station does not see any data transfer from the ULE device after a predefined period lapsed from the transmission of the ULE dummy bearer it would release the ULE dummy bearer automatically.
b. If the ULE device would not receive a ULE dummy bearer within a certain period after its last ULE dummy request was sent, it may assume that its one or more ULE dummy requests were not seen by the base station, and might repeat the transmission of one or more ULE dummy requests.

The base station may need to send the NEMo dummy bearer for 2.56 s. To have continuous ULE operation the base station may transmit more than a single dummy bearer (for example two ULE dummy bearers), or incorporate a ULE Dummy bearer BField into a NEMo Dummy bearer itself by using a long slot which could carry all ULE dummy bearer BField subfields (to form a NEMo++ dummy bearer).

At the end of the NEMo entrance phase, just before the dummy bearer is switched off, there may be a small window where the fast sync may fail. It is assumed that this will be sufficiently covered by the backoff in the ULE devices.

Fast Actuators (line powered). AC Switches are line powered. They need fast response times, but power consumption is no concern here. When the base station needs to page such a fast actuator, it can establish a ULE Dummy Bearer (with paging data). The fast actuator would be in permanent ULE scanning mode (scanning through all carriers?), and see the ULE dummy bearer as soon as it is established. Then it can extract paging data, or do a packet mode transfer as necessary.

Error Scenario—Base Station Not In NEMo Mode.

When the ULE device wakes up while the base station is no longer in NEMo scanning mode and has more data to send than a single packet, it can lock to the existing ULE dummy bearer, so this is not a problem.

What is a problem is, if the device attempts an asynchronous single packet transfer and the base station is not in NEMo mode.

This problem can be managed if the wireless communication devices that communicate with the base station are aware whether the base station is NEMo capable from the capabilities transmitted by the base station during subscription.

However there maybe scenarios when the base station will not enter NEMo anymore more or less permanently e.g. when a GAP handsets is subscribed to that base. In that case there is provided a mechanism to lets the device that this is the case.

The base station may send a 'not entering NEMo' indication that could also be added to the dummy bearer, or it could be transferred via a ULE service call.

Alternatively—if the ULE device sends multiple (a predefined number) of dummy bearer requests and is not responded it may assume that the base station is not in a NEMo mode and wait to receive the next ULE dummy bearer (of NEMo++ dummy bearer) for synchronizing its transmission with the base station beacons.

Figure 7:
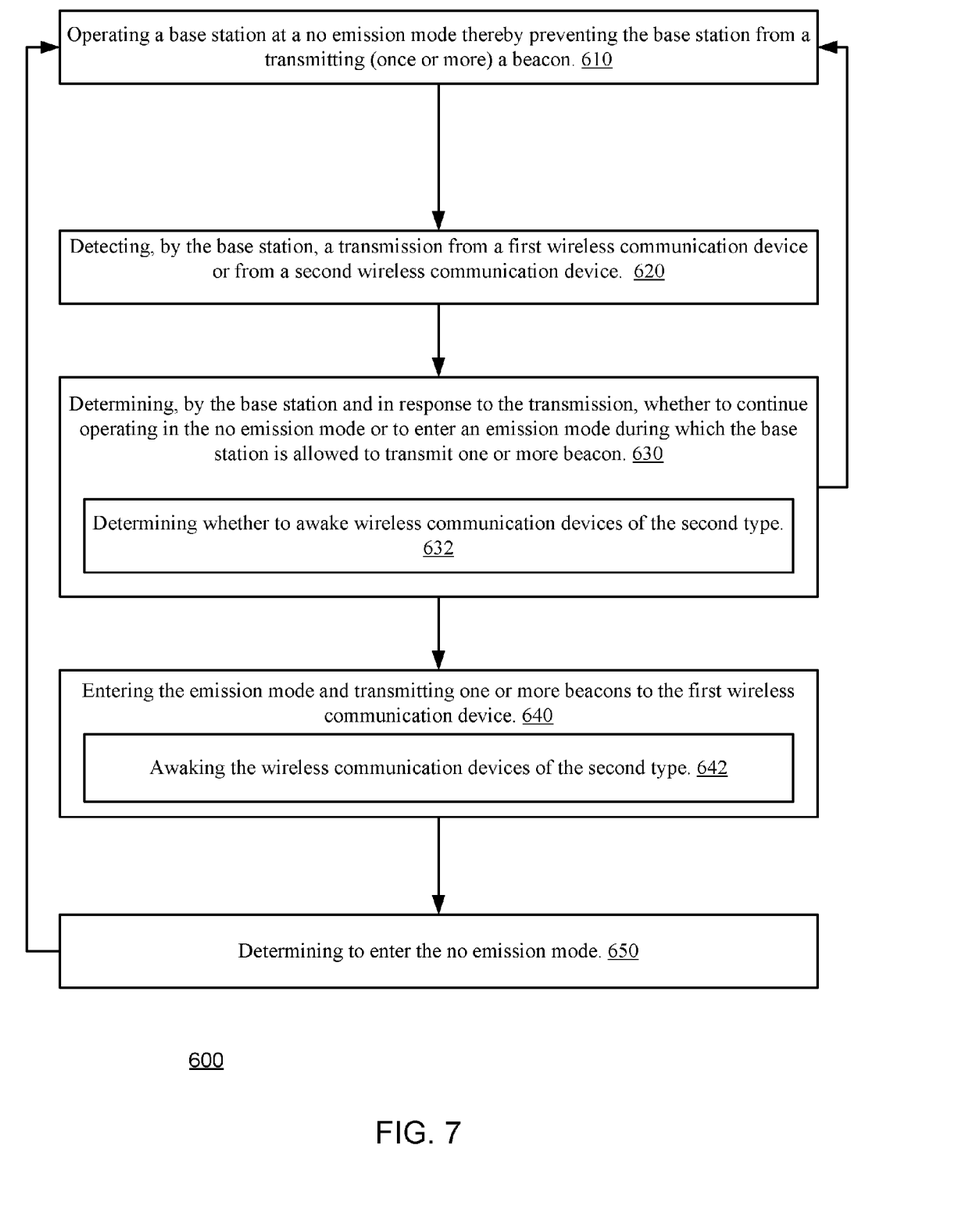
FIG. 7 illustrates a method according to an embodiment of the invention.

FIG. 7 illustrates method 600 according to an embodiment of the invention.

Method 600 is executed by a base station.

Method 600 starts by stage 610 of operating a base station at a no emission mode thereby preventing the base station from a transmitting (once or more) a beacon.

Stage 610 may be followed by stage 620 of detecting, by the base station, a transmission from a first wireless communication device or from a second wireless communication device. The first and second wireless communication devices may be of the same type or be of different types. Different types of communication devices may differ from each other, by example, by the communication protocols they support. For example the first wireless communication device may be a ULE device while the second wireless communication device may be a NEMo device such as NEMo handset.

Stage 620 may be followed by stage 630 of determining, by the base station and in response to the transmission, whether to continue operating in the no emission mode or to enter an emission mode during which the base station is allowed to transmit one or more beacon.

Stage 630 may be responsive to an expected amount of data to be transmitted in association with the transmission from the first wireless communication device.

Stage 630 may include stage 632 of determining whether to awake wireless communication devices of the second type (for example—NEMo handsets). If determining to awake the wireless communication devices of the second type then stage 640 may include stage 642 of awaking the wireless communication devices of the second type.

The determining of stage 632 may be responsive to the length of transmissions with the wireless communication device of the first type or may be responsive to any other criterion. For example—Stage 632 may include awakening wireless communication devices of a second type if the base station communicated with the first wireless communication device for at least a predefined duration.

If determining to continue operating in the no emission mode than jumping to stage 610.

If determining to enter the emission mode (non-NEMo mode) then stage 630 may be followed by stage 640 of entering the emission mode and transmitting one or more beacons to the first wireless communication device.

Stage 640 may be followed by stage 650 of determining to enter the no emission mode and (if determining to enter the no emission mode) jumping to stage 610.

Stage 640 may include transmitting different beacons to different types of wireless communication device and/or transmitting a hybrid beacon (for example a NEMo++ dummy bearer) to communication devices of multiple types.

The hybrid beacon may include first control fields for controlling a behavior (for example—timing and/or channel of reception and/or transmissions) of the first wireless device and second control fields for controlling a behavior of at least one wireless communication devices of a second type.

Beacons aimed to different types of wireless communication device may differs from the other by a value of at least one beacon identifier.

While the above descriptions contain many specifics, these should not be construed as limitations on the scope, but rather as an exemplification of one or several embodiments thereof. Many other variations are possible. Accordingly, the scope should be determined not by the embodiments illustrated, but by the appended claims and their legal equivalents.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may cause the storage system to allocate disk drives to disk drive groups.

A computer program is a list of instructions such as a particular application program and/or an operating system. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on a non-transitory computer readable medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; nonvolatile memory storage media including semiconductor-based memory units such as FLASH memory, EEPROM, EPROM, ROM; ferromagnetic digital memories; MRAM; volatile storage media including registers, buffers or caches, main memory, RAM, etc.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as a service to users and programs of the system.

The computer system may for instance include at least one processing unit, associated memory and a number of input/output (I/O) devices. When executing the computer program, the computer system processes information according to the computer program and produces resultant output information via I/O devices.

In the foregoing specification, the invention has been described with reference to specific examples of embodiments of the invention. It will, however, be evident that various modifications and changes may be made therein without departing from the broader spirit and scope of the invention as set forth in the appended claims.

The connections as discussed herein may be any type of connection suitable to transfer signals from or to the respective nodes, units or devices, for example via intermediate devices. Accordingly, unless implied or stated otherwise, the connections may for example be direct connections or indirect connections. The connections may be illustrated or described in reference to being a single connection, a plurality of connections, unidirectional connections, or bidirectional connections. However, different embodiments may vary the implementation of the connections. For example, separate unidirectional connections may be used rather than bidirectional connections and vice versa. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the invention is not limited to physical devices or units implemented in non-programmable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as 'computer systems'.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

We claim:

1. A method, comprising:
operating a base station at a first operational mode thereby preventing the base station from transmitting one or more beacons;
detecting, by the base station, a transmission from a wireless communication device;
determining, by the base station and in response to the transmission from the wireless communication device, whether to continue operating in the first operational mode or to enter an emission mode during which the base station is allowed to transmit the one or more beacons; wherein when the wireless communication is expected to send data to the base station, the determining of whether to enter the emission mode is responsive to an expected amount of the data to be received from the wireless communication device;
determining to maintain in the first operational mode when the expected amount of data is a single packet;
and entering the emission mode, if it is determined to enter the emission mode and transmitting the one or more beacon to the wireless communication device.

2. The method according to claim 1 wherein the wireless communication device is of a first type of wireless communication devices; and wherein the method further comprises determining whether to awake one or more wireless communication devices of a second type.

3. The method according to claim 2 wherein the first type of wireless communication devices comprises ultra low energy (ULE) wireless communication devices and wherein the second type of wireless communication devices comprises no-emission mode (NEMo) wireless communication devices.

4. The method according to claim 3 comprising awakening at least one wireless communication devices of the second type if the base station communicated with the wireless communication device of the first type for at least a predefined duration.

5. The method according to claim 1 wherein the transmitting of the one or more beacons comprises transmitting different types of beacons to different types of wireless communication devices.

6. The method according to claim 5 wherein different types of beacons are identified by different identifiers.

7. The method according to claim 1 wherein the transmitting of the one or more beacons comprises transmitting a hybrid beacon for controlling a behavior of different types of wireless communication devices.

8. The method according to claim 1 wherein the wireless communication device is of a second type of wireless communication devices.

9. The method according to claim 1 comprising determining to maintain in the first operational mode when the expected amount of data is a keep alive message from an ultra low energy (ULE) wireless communication devices.

10. The method according to claim 1 wherein the transmission from a wireless communication device is indicative of a requested operational mode of the base station;
wherein the determining of whether to enter the emission mode comprises estimating whether the requested operational mode of the base station is the emission mode or the first operational mode.

11. The method according to claim 1 wherein the transmission from the wireless communication device mode either comprises a request that is aimed to the base station to enter the emission mode or is an asynchronous transmission that does not include the request that is aimed to the base station to enter the emission mode; wherein the determining of whether to enter the emission mode comprises searching for the request that is aimed to the base station to enter the emission mode.

12. A non-transitory computer readable medium that stores instructions that once executed by a base station cause the base station to operate at a first operational mode thereby preventing the base station from transmitting one or more beacons;
detect a transmission from a wireless communication device; determine, in response to the transmission from the wireless communication device, whether to continue operating in the first operational mode or to enter an emission mode during which the base station is allowed to transmit the one or more beacons; wherein when the wireless communication is expected to send data to the base station, the determining of whether to enter the emission mode is responsive to an expected amount of the data to be received from the wireless communication device; determine to maintain in the first operational mode when the expected amount of data is a single packet; and enter the emission mode, if it is determined to enter the emission mode and transmit the one or more beacon to the wireless communication device.

13. The non-transitory computer readable medium according to claim 12 wherein the transmission from a wireless communication device is indicative of a requested operational mode of the base station; wherein the non-transitory computer readable medium stores instructions that once executed by a base station cause the base station to determine whether to enter the emission mode by estimating whether the requested operational mode of the base station is the emission mode or the first operational mode.

14. The non-transitory computer readable medium according to claim 12 wherein transmission from the wireless communication device mode either comprises a request that is aimed to the base station to enter the emission mode or is an asynchronous transmission that does not include the request that is aimed to the base station to enter the emission mode;
wherein the non-transitory computer readable medium stores instructions that once executed by a base station cause the base station to determine whether to enter the emission mode by searching for the request that is aimed to the base station to enter the emission mode.

15. A base station that comprises a receiver, a transmitter and a controller;
wherein the controller is arranged to operate the base station at a first operational mode thereby preventing the base station from transmitting one or more beacons;
wherein the receiver is arranged to detect a transmission from a wireless communication device;
wherein the controller is arranged to determine, in response to the transmission from the wireless communication device, whether to continue operating in the no emission first operational mode or to enter a emission mode during which the base station is allowed to transmit the one or more beacons;
wherein the controller is arranged to determine, when the wireless communication is expected to send data to the base station, whether to enter the emission mode in response to an expected amount of the data to be received from the wireless communication device;
wherein the controller is arranged to determine to maintain in the first operational mode when the expected amount of data is a single packet; and
wherein the controller is arranged to operate the base station in an emission mode, if it is determined to enter the emission mode during which the transmitter is arranged to transmit the one or more beacons to the wireless communication device.

16. The base station according to claim 15 wherein the wireless communication device is of a first type of wireless communication devices; and wherein the controller is arranged to determine whether to awake one or more wireless communication devices of a second type.

17. The base station according to claim 16 wherein the first type of wireless communication devices comprises ultra low energy (ULE) wireless communication devices and wherein the second type of wireless communication devices comprises no-emission mode (NEMo) wireless communication devices.

18. The base station according to claim 17 wherein the controller is arranged to trigger an awakening of at least one wireless communication devices of the second type if the base station communicated with the wireless communication device of the first type for at least a predefined duration.

19. The base station according to claim 15 wherein the transmitter is arranged to transmit the one or more beacons by transmitting different types of beacons to different types of wireless communication devices.

20. The base station according to claim 19 wherein different types of beacons are identified by different identifiers.

21. The base station according to claim 15 wherein the transmitter is arranged to transmit the one or more beacons by transmitting a hybrid beacon for controlling a behavior of different types of wireless communication devices.

22. The base station according to claim 15 wherein the wireless communication device is of a second type of wireless communication devices.

23. The base station according to claim 15 wherein the transmission from a wireless communication device is indicative of a requested operational mode of the base station; wherein the controller is configured to determine whether to enter the emission mode by estimating whether the requested operational mode of the base station is the emission mode or the first operational mode.

24. The base station according to claim 15 wherein transmission from the wireless communication device mode either comprises a request that is aimed to the base station to enter the emission mode or is an asynchronous transmission that does not include the request that is aimed to the base station to enter the emission mode; wherein the controller is configured to determine whether to enter the emission mode by searching for the request that is aimed to the base station to enter the emission mode.

* * * * *